United States Patent [19]
Kakinuma et al.

[11] Patent Number: 5,721,597
[45] Date of Patent: Feb. 24, 1998

[54] DISPLAY ELEMENT USING A LIQUID CRYSTAL SUBSTANCE AND IMAGE DISPLAYING METHOD USING THE SAME

[75] Inventors: Takeo Kakinuma; Kensuke Ito; Minoru Koshimizu, all of Nakai-machi, Japan

[73] Assignee: Fuji Xerox Co., Ltd., Tokyo, Japan

[21] Appl. No.: 603,158

[22] Filed: Feb. 20, 1996

[30] Foreign Application Priority Data

Mar. 1, 1995 [JP] Japan .................. 7-65287

[51] Int. Cl.$^6$ .................................... G02F 1/133
[52] U.S. Cl. .................... 349/86; 349/10; 349/88; 345/95
[58] Field of Search ................ 345/95; 349/10, 349/86, 88

[56] References Cited

U.S. PATENT DOCUMENTS

| | | | |
|---|---|---|---|
| 4,435,047 | 3/1984 | Fergason | 349/86 |
| 4,606,611 | 8/1986 | Fergason | 349/90 |
| 4,616,903 | 10/1986 | Fergason | 349/86 |
| 4,944,576 | 7/1990 | Lacker et al. | 349/94 |
| 4,946,263 | 8/1990 | Vaz et al. | 349/34 |
| 5,270,843 | 12/1993 | Wang | 349/90 |
| 5,351,143 | 9/1994 | Sato et al. | 349/12 |
| 5,530,566 | 6/1996 | Kumar | 349/86 |
| 5,530,567 | 6/1996 | Takei | 349/86 |
| 5,621,552 | 4/1997 | Coates et al. | 349/86 |
| 5,638,194 | 6/1997 | Yamada et al. | 349/86 |

FOREIGN PATENT DOCUMENTS

| | | |
|---|---|---|
| 58-501631 | 9/1983 | Japan . |
| 61-501345 | 7/1986 | Japan . |
| 6-11686 | 1/1994 | Japan . |

OTHER PUBLICATIONS

Rumiko Yamaguchi, "Thermally Addressed Polymer Dispersed Liquid Crystal Displays", (1992), J.Appln. Phys. vol. 31 (1992) pp. L 1093–L 1095, Part 2, No. 84.

*Primary Examiner*—Raymond J. Bayerl
*Assistant Examiner*—Seth D. Vail
*Attorney, Agent, or Firm*—Oliff & Berridge, P.L.C.

[57] ABSTRACT

A method and apparatus in which the liquid crystal material having cross-over frequency is used for displaying an image, the liquid crystal material is dispersed in the transparent polymer in a phase-separated state, a first voltage signal having a first frequency lower than the cross-over frequency is applied to the liquid crystal material to orient reversibly the liquid crystal material to a first direction to display temporary information, then a second voltage signal having a magnitude higher than the first voltage is selectively applied to orient permanently the liquid crystal material to the first direction to display permanent information and a third voltage signal having a second frequency higher than the cross-over frequency is selectively applied to orient the liquid crystal material perpendicularly to the first direction, to erase the permanent information. The dynamic image and the memorized static image is displayed interchangeably by selecting the applied voltage signal having a specific frequency range.

9 Claims, 6 Drawing Sheets

DISPLAY ELEMENT USING A LIQUID CRYSTAL SUBSTANCE AND IMAGE DISPLAYING METHOD USING THE SAME

BACKGROUND OF THE INVENTION

The present invention relates generally to a liquid crystal display element, and more particularly concerns a method and display element capable interchangeably of displaying both dynamic images and static images by using a specific liquid crystal substance composed of a transparency polymer film and a dual frequency responsive liquid crystal material.

Generally, a display element utilizing a twisted nematic liquid crystal (TN-type) or a super twisted nematic liquid crystal (STN-type) has been used to build a display device with good operational characteristics in terms of optical rotation. However, because of the difficulty of the thickness control of the liquid crystal layer, relatively stiff elements such as glass substrate or plastic substrate have been used to control the thickness of the liquid crystal layer. Moreover, because liquid crystal materials have high sensitivity to the direction of optical polarization of incident light, a pair of polarizing plates have been used to control the direction of optical polarization of the incident light. The stiff substrates make the display device inflexible. The polarizing plate give a narrow visible angle and a low contrast visibility to the display device. Various approaches and solutions, and more particularly, various polymer dispersed type liquid crystal display have been proposed to solve these problems. The following disclosures about polymer dispersed type liquid crystal displays may be relevant to the present invention.

U.S. Pat. No. 4,435,047 issued Mar. 6, 1984
U.S. Pat. No. 4,616,903 issued Oct. 14, 1986
U.S. Pat. No. 4,606,611 issued Aug. 19, 1986
JP 58-501631 A2 published Sep. 29, 1983
JP 61-501345 A2 published Jul. 3, 1986
Japanese Journal of Applied Physics Volume 31, pages L1093–L1095, Part 2, No. 8A published Aug. 1, 1992
JP 6-11686 A2 published Jan. 21, 1994
U.S. Pat. No. 4,944,576 issued Jul. 31, 1990
U.S. Pat. No. 4,946,263 issued Aug. 7, 1990

The relevant portions of the foregoing disclosures may be briefly summarized as follows:

U.S. Pat. No. 4,435,047 discloses a display device including a nematic liquid crystal material having a positive dielectric anisotropy which is encapsulated in a polymer material such as Polyvinyl alcohol and dispersed in a transparent polymer matrix. The inner liquid crystal molecules are partially distorted by capsule wall enough to be insensitive to the direction of the optical polarization of the incident light. The AC power source coupled to the electrodes of liquid crystal display is also disclosed and the transparent state and the opaque state of the display device are changed reversibly by applying switching voltages.

U.S. Pat. No. 4,616,903 discloses a liquid crystal display which has features similar to U.S. Pat. No. 4,435,047. U.S. Pat. No. 4,606,611 discloses a liquid crystal display which has liquid crystal material in a containment medium that tends to distort the structure of the liquid crystal material to align generally to a wall of such containment medium with no electric field. An AC voltage source as a driving source is also disclosed.

JP 58-501631 A2 discloses the same liquid crystal display with U.S. Pat. No. 4,616,903.

JP 61-501345 A2 discloses the same liquid crystal display with U.S. Pat. No. 4,606,611.

Japanese Journal of Applied Physics Volume.31, pages L1093–L1095, Part 2, No. 8A discloses the polymer dispersed liquid crystal display in which an opaque state and an transparent state of the display can be switched reversibly by the switching of relatively low driving voltage. It is also disclosed that the transparent state can be "memorized" for a long time after the applying and cutting off of relatively high driving voltage and the memorized transparent state can be reversed to an initial opaque state by applying heat energy with or without an electric field.

U.S. Pat. No. 4,944,576 discloses a polymer dispersed liquid crystal film having a partially pre-aligned liquid crystal material. The pre-alignment of the liquid crystal is done by applying a voltage to a pair of electrodes, when the polymer matrix is cured by UV light. The dual-frequency responsive liquid crystal material having a cross-over frequency is disclosed as a dispersed liquid crystal. The polymerization of the film is conducted with an electric field having a high frequency that is higher than the cross-over frequency in which the liquid crystal material indicates a negative dielectric anisotropy. And the display operation of the film is conducted with an electric field having a low frequency lower than the cross-over frequency in which the liquid crystal material indicates a positive dielectric anisotropy.

U.S. Pat. No. 4,946,263 discloses an optical device using a polymer dispersed liquid crystal film in which the inactive opaque state and active transparent state of the film are only reversibly controlled by switching a relatively low driving voltage having a low frequency lower than the cross-over frequency of the adopted liquid crystal material. A frequency equal or near to the cross-over frequency, in which the liquid crystal material is isotropically insensitive to the frequency, is adopted to induce a dielectric heating of the film to increase the response time of the film preventing any change of states of the liquid crystal material.

Some of the aforementioned liquid crystal display devices have two displaying modes, first one is the "dynamic image displaying mode" or "reversible" mode in which an active transparent state and an inactive opaque state of the device can be reversibly changed by switching of driving voltage, second one is the "static image displaying" mode or "memory mode" in which an activated transparent state of the liquid crystal is kept stably for a long time after the applying and cutting off of the driving voltage. And the switching of the display mode between "dynamic image displaying mode" and "static image displaying mode" has been typically done by applying heat energy with or without an electric field to the liquid crystal display device. The heat energy has been required to generate the phase transition of the liquid crystal material from activated state in the "memory mode" to random inactivated state in the "reversible mode". However the applying of the heat energy and the required cooling time following the heat are kind of insufficient and time consuming.

The references cited herein are incorporated by reference for their teachings.

SUMMARY OF THE INVENTION

The present invention provides a method of displaying information on a display using a polymer liquid crystal display element containing a transparent polymer and dual-frequency responsive liquid crystal material, the liquid crystal material having a cross-over frequency, and dispersed in the transparent polymer in a phase-separated state.

In accordance with one aspect of the invention, this method is executed by selectively applying a first voltage signal having a first frequency lower than the cross-over frequency to orient reversibly the liquid crystal material to a first direction to display temporary information, selectively applying a second voltage signal having a magnitude higher than the first voltage, and a first frequency to orient permanently the liquid crystal material to the first direction to display permanent information, and selectively applying a third voltage signal having a second frequency higher than the cross-over frequency to orient the liquid crystal material perpendicularly to the first direction, to erase the permanent information.

This invention provides a method of erasing information on a display using a polymer liquid crystal device containing a transparent polymer and dual-frequency responsive liquid crystal material, the liquid crystal material having cross-over frequency, and dispersed in the transparent polymer in a phase-separated state. The method is executed by selectively applying a first voltage signal having a first frequency lower than the cross-over frequency to orient permanently the liquid crystal material to a first-direction to display information permanently and selectively applying second voltage signal having a frequency higher than the cross-over frequency to orient the liquid crystal material perpendicularly to the first direction, to erase the permanent information.

This invention also provides a liquid crystal display device for displaying a dynamic moving image and a static dynamic image interchangeably comprising: a transparency modulation layer having a transparent polymer and dual-frequency responsible liquid crystal material which have a cross-over frequency dispersed in the transparent polymer in a phase-separated state to make an interface portion therebetween, the interface portion having an irregular surface portion enough to prevent the free orientation of the liquid crystal material response to an selective electric field; a plurality of electrode to apply an electric field; and a driving source coupled to the electrodes to provide a first voltage to provide the selective electric field having a first frequency lower than the cross-over frequency, a second voltage magnitudely higher than the first voltage having the first frequency and a third voltage having a second frequency higher than the cross-over frequency.

DESCRIPTION OF THE PREFERRED EMBODIMENTS

Figure 1:
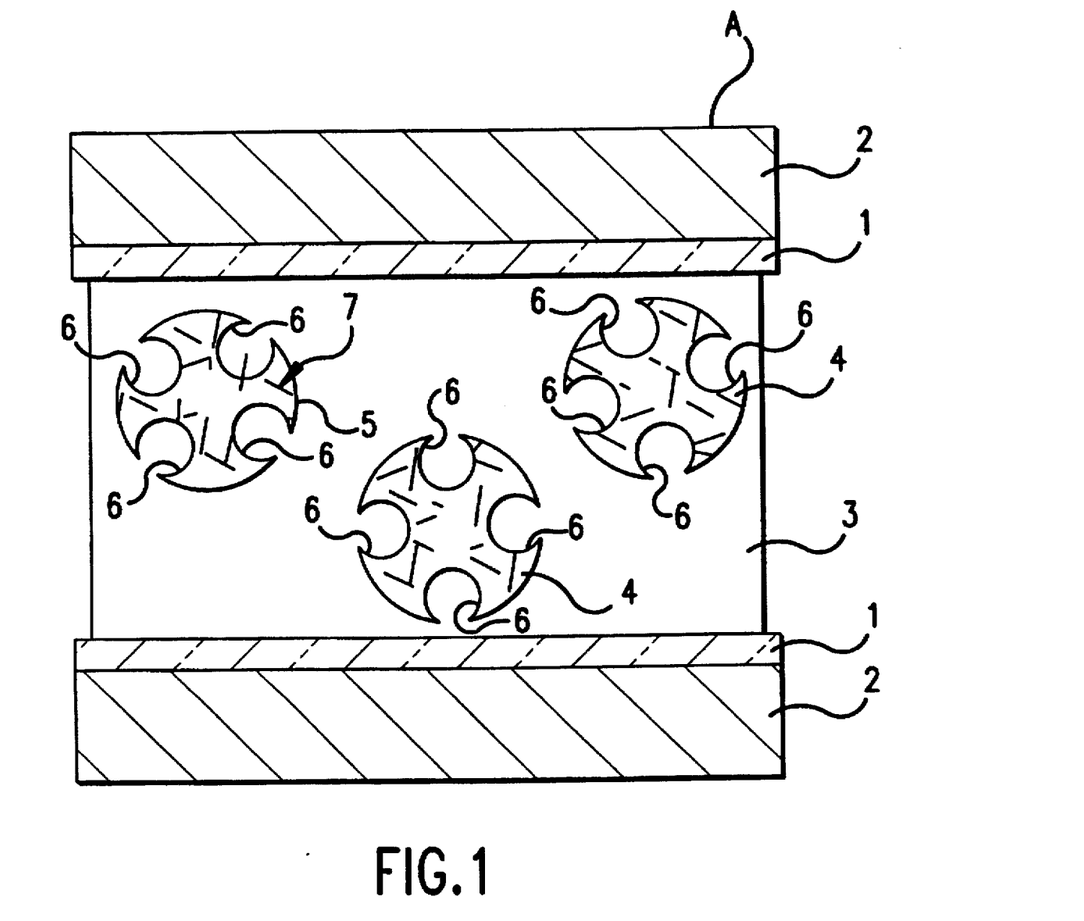
FIG. 1 is a cross-sectional view of the liquid crystal display device in accordance with the present invention.

With reference now to the drawings, which illustrate a preferred embodiment of the invention and do not limit same, as indicated in FIG. 1, the liquid crystal display device A is composed of a pair of glass plates 2, having a pair of transparent electrodes such as indium tin oxide (ITO) film 1, and polymer-liquid crystal compound layer 3. The dual-frequency liquid crystal material 4 is dispersed and held in the polymer matrix film 3 in a phase separated state. At the interface portion 5 between the liquid crystal material 4 and polymer matrix film 3, there are made many irregularities or "microconvex" portions 6. These irregularities or microconvex portions 6 make the surface area of the interface portion 5 between two materials enlarge. Each of the liquid crystal droplets 4 may be contacted and connected each other to make a continuous and larger liquid crystal phase structure. The liquid crystal material 4 contains dual-frequency liquid crystal material which has a characteristic in which signs of dielectric anisotropy of the liquid crystal substance can be changed depending on applied frequency of the switching voltage. The applied frequency range is divided into relatively low frequency range and relatively high frequency range by the point of specific frequency which is defined as "cross-over frequency". In the high frequency range, the liquid crystal material indicates negative dielectric anisotropy. In the low frequency range, the liquid crystal material indicates positive dielectric anisotropy. The minus sign indicates horizontal orientation of the liquid crystal material. The plus sign indicates vertical orientation of the liquid crystal material. At the cross-over frequency, the liquid crystal material indicates no sign of dielectric anisotropy which means the liquid crystal material does not receive any orientation force from applied electric field. Therefore, two orientation state, i.e. vertical orientation state and the horizontal orientation state, of the liquid crystal substance can be controlled by selection of applied frequency.

The precursor of the polymer material 3 contains monomers or olygomers which have polymerizable functional group and optionally, polymerization initiators, sensitizers and chain reaction transfer substances. The monomer compounds which can be used in present invention include:

stylene, maleic acid, itaconic acid, acrylamide, N-methylolacrylamide, diacetoneacrylamide, 1, 3-butadiene; acrylic acid, methacrylic acid and fumalic acid having at least one functional group such as methyl group, ethyl group, i-propyl group, t-buthyl group, amyl group, 2-ethylhexyl group, n-octhyl group, n-nonyl group, n-decyl group, n-undecyl group, n-dodecyl group, n-hexadecyl group, n-octadecyl group, cyclohexyl group, benzyl group, methoxyethyl group, butoxyethyl group, phenoxyethyl group, alryl group, metharyl group, lauryl group, glycydyl group and 2-hydroxyethyl group; (meth) acryl ester or poly-(meth)acryl ester of ethyleneglycol, propyleneglycol, polypropyleneglycol, 1, 3-buthyleneglycol, tetramethyleneglycol, hexamethyleneglycol, trimethylolpropane, glyceline and pentaelyththol; vinylacetate, buthylacetate, vinylbenzoate, acrylonitrole, acethylvinylether, limonene, cyclohexene, diallylphthalate, diallylisophthalate, 2- or 3- or 4-vinylpyridine; alkylether compound of acrylic acid and methacrylic acid; acrylamide, methacrylamide and N-hydroxyethylacrylamide or alkylether compound thereof; di-(meth) acrylate of diol obtained by adding of 2 mol of ethyleneoxide or propyleneoxide to 1 mol of neopenthylglycol or 1, 6-hexanediol; di- or tri- (meth) acrylate of triol obtained by adding not less than 3 mol of ethyleneoxide or propyleneoxide to 1 mol of trimethylolpropane; di-(meth)acrylate of diol obtained by adding not less than 2 mol of ethyleneoxide or propylene oxide to 1 mol of bisphenol A; reaction products from 1 mol of 2-hydroxyethyl (meth)acrylate and 1 mol of phenylisocyanate or n-buthylisocyanate; poly (meth)acrylate of dipentaeryththol, diacrylates of longchain fatty acids triacrylate of saturated acid, captoracton modified hydroxypybarinic acid ester-neopenthylglycoldiacrylate, tricyclodecane-di-methyloldiacrylate, tris (acryloxyethyl) isocyanulate, polyolefin modified neopenthylglycol diacrylate.

The polymerization initiators which can be used in present invention include:

2-hydroxy-2-methyl-1-phenylpropane-1-on (Merck Co., Darocure, product name, 1173), 1-hydroxycyclohexylphenylketone (Chiba Gaigy Co., Irgacure, product name, 184), 1-(4-isopropylphenyl)-2-hydroxy-2-methylpropane-1-on (Merck Co., Darocure, product name, 1116), benzyldimethylketal (Chiba Gaigy Co., Irgacure, product name, 651), 2-methyl-1-[4-(methylthio) phenyl]-2-morpholynopropanone-1 (Chiba Gaigy Co., Irgacure, product name, 907), 2,4-diethyloxanetone (Nippon Kayaku Co., Kayacute, product name, DETX), p-dimethylaminobenzoic acid (Nippon Kayaku Co., Kayacute, product name, EPA), isopropylthioxanthone (Wordprekinsop Co., Quantacure, product name, ITX). Among of them, 2-hydroxy-2-methyl-1-phenylpropane-1-on which is a liquid in a room temperature, can be preferably used in terms of compatibility with the liquid crystal material.

If necessary, polymerization chain reaction transfer substances such as butanediol-di-thiopropionate, pentaeristoltetrachls (β-thioproplonate) and triethyleneglycoldimercaptan can be used in present invention.

As the liquid crystal material of the present invention, generally both or mixture of nematic type and cholesteric type liquid crystal material can be used. From the standpoint of the low addressing voltage capability, nematic type liquid crystal material is preferably used in this invention.

The dual-frequency responsive liquid crystal materials generally exhibit two different behaviors, depending on applied frequency of the driving voltage. An electric field at a first frequency will cause the liquid crystal molecules to align parallel to the direction of the applied electric field. An electric field at a second and higher frequency will cause the molecules to align perpendicularly to the direction of the applied electric field. The specific frequency at which the molecules are equally influenced to align both directions is defined as the "cross-over frequency" as mentioned before. Under an electric field having a frequency less than the cross-over frequency, the liquid crystal material has positive dielectric anisotropy. Under an electric field having a frequency greater than the cross-over frequency, the liquid crystal material has negative dielectric anisotropy.

These dual-frequency responsive liquid crystal materials are generally mixtures of liquid crystal substances. These liquid crystal substances include rod-like molecules such as mono and diesters having two or more phenyl groups or saturated carbon rings such as cyclohexyl rings or saturated carbon chains such as alkyl or alkoxy group having 1 to 20 carbons or unsaturated carbon groups such as cyclohexylene rings or phenylene rings. These dual-frequency responsive liquid crystal materials are disclosed in U.S. Pat. No. 4,236,150, U.S. Pat. No. 4,688,899, U.S. Pat. No. 4,729,639, U.S. Pat. No. 4,759,870, U.S. Pat. No. 4,836,654, U.S. Pat. No. 4,927,242 and U.S. Pat. No. 4,946,260, etc. The disclosure of these documents are incorporated herein as the disclosure of the present invention.

Also, typical dual-frequency responsible liquid crystal materials are commercially available from Chisso Corporation, sold under the product code as FX-1001 and FX-1002. The chyral material containing assymetrical carbon atoms can be introduced to the liquid crystal material. Preferably, liquid crystal materials which have the cross-over frequencies in a range from 0.1 to 50 KHZ, and the more preferably in a range from 0.5 to 20 KHz can be used in present invention. An excessively high cross-over frequency results in the generation of heat, because of the result of rapid switching of the device higher than the cross-over frequency.

For substrates 2, receiving liquid crystal compound layer 3 therebetween, glass plates such as Corning, product name, 7049 glass or plastic film such as PET or PES can be used. In order to make a transparent electrode on the substrates, vapor deposition method, plasma CVD method or sputtering methods for placement of conductive materials on a surface can be adopted. The substrates are typically transparent when the display device is to be used as a transparent-type display. When the device is used as a reflection-type display, one of the substrates may not be transparent, in order to reflect the incident light.

The liquid crystal material is dispersed in the transparent polymer in a phase-separated state to make a display element. To make such a phase separation state, the polymer-liquid crystal compound prepolymer can be prepared by the following methods;

1. Mix a liquid crystal material, a polymer material which has low compatibility with the liquid crystal material and a solvent of the polymer material and stir the mixture to make an emulsion state.
2. Mix a liquid crystal material and a polymer material which has high compatibility to the liquid crystal material at a relatively high temperature but have low compatibility at relatively low temperature, and cool the mixture to deposit liquid crystal material in the polymer.
3. Mix a liquid crystal material and a monomer material which is soluble to the liquid crystal material, then polymerize the monomer to deposit liquid crystal material in the polymer.

To make the display element, the prepolymer of the polymer-liquid crystal compound is injected into the space between two substrates and polymerized therein. However, the display device also can be made by the process in which the prepolymer is initially coated on first substrate by using coater such as spinner or barcoater, and then the second substrate is placed on the coated substrate, subsequently the prepolymer is polymerized therein. The display element can be made by injecting the liquid crystal material into a porous polymer material. In method #2 or #3 above, liquid crystal material is dissolved uniformly in the polymer or monomer solution initially. Then as the polymerization of the monomer or expel of the solvent goes on, the solubility of the liquid crystal material to the solution or the monomer is reduced because of the reducing of the monomer or the solvent concentration. Therefore, the liquid crystal material dissolved in the solution gradually goes out from the solution to make phase separation state. In addition, the liquid crystal material has a good compatibility to the monomer or polymer solution when the liquid crystal material is in an isotropic liquid state in a relatively high temperature. As the temperature goes down, the isotropic liquid state of the liquid crystal material gradually turn into normal liquid crystal state to reduce the solubility. Thus the phase-separated state of the polymer-liquid crystal display device is formed. To make an non-uniform or an irregular or microconvex surface at the interface portion, either method #2 or #3 can be used with a combination of polymer materials and liquid crystal materials. The dispersed size of the liquid crystal material in the transparent polymer is preferably in a range from 0.05 to 10.0 µm, more preferably from 0.1 to 5.0 µm, most preferably 0.4 to 2.0 µm.

A Polymerization method to polymerize the polymer-liquid crystal compound can be selected from various method such as bulk polymerization, solution polymerization, emulsion polymerization, heat polymerization and photopolymerization. Uniform irradiation of Ultra-violet (U.V.) or Visible light having fixed intensity is preferably used to the polymerization of the prepolymer material. Also, a heat beam or an electron beam can be used instead of U.V. or Visible light. The glass plates or a plastic films contemplated for use generally have a characteristic of preventing transmission of relatively short wavelength U.V. light. Accordingly relatively long wavelength U. V. light in a range from 300 nm to 350 nm or relatively short wavelength visible light about 450 nm are preferably used to enhance the polymerization efficiency. These beams can be applied more than one time.

Figure 3A:
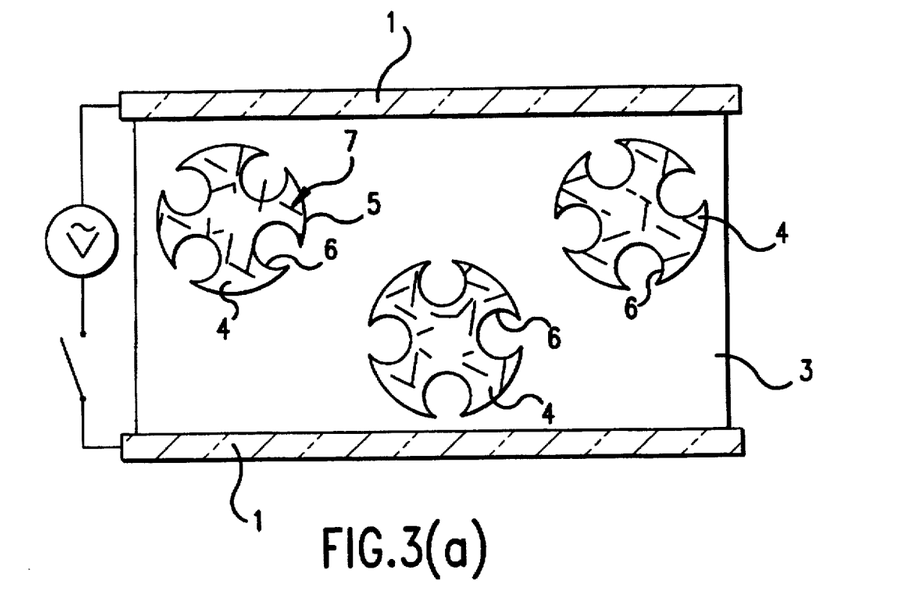
FIGS. 3(a) and 3(b) are a schematic representation of the operational model of reversible state in accordance with the present invention.

As disclosed in FIGS. 1, 3(a) and (b), 4(a)-(c) and 5(a)-(c), a kind of irregular or ununiform or microconvex portion is made at the interface portion between the liquid crystal material and the transparent polymer material. These portions may control the threshold voltage of the orientation of the liquid crystal molecules which exist at the interface portion.

Figure 2:
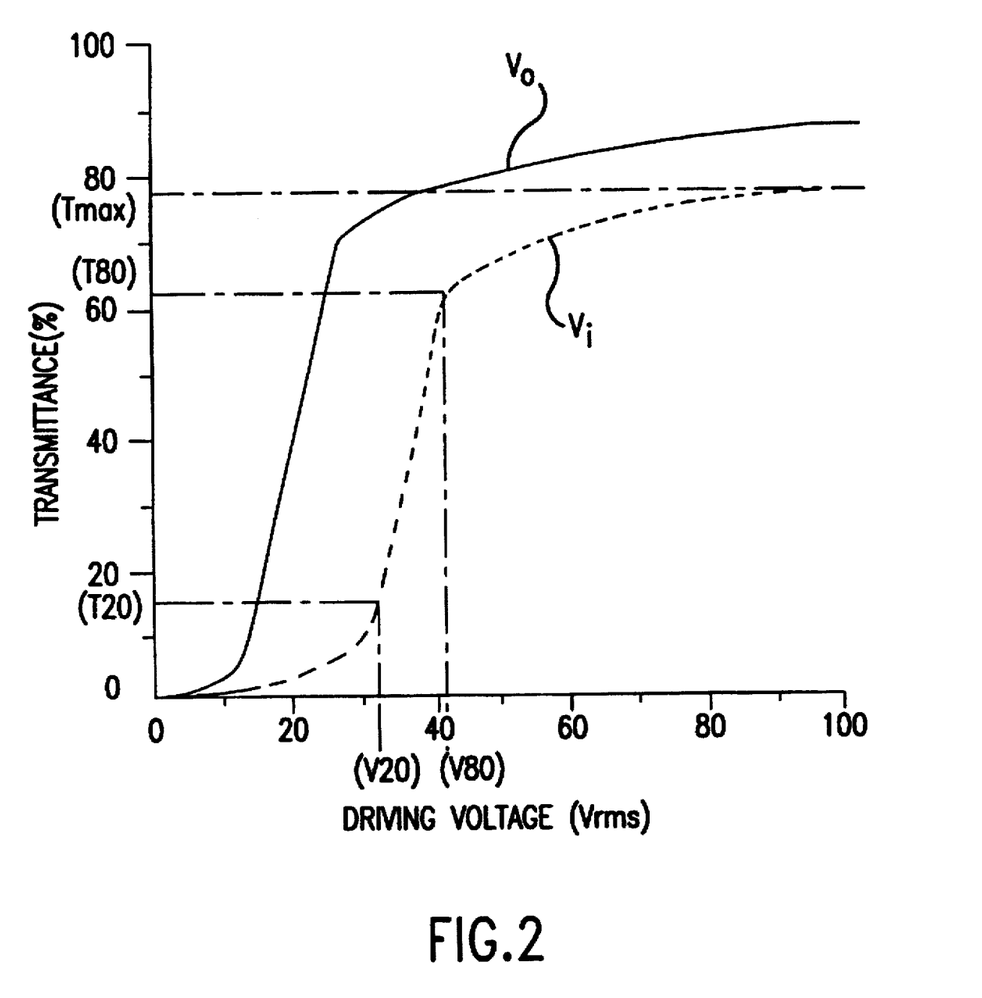
FIG. 2 is a graph relating the hysteresis voltage-transmission characteristic of the liquid crystal display device in accordance with the present invention.

FIG. 2 is a graph showing the relationship between transmission properties and applied voltage of the liquid crystal element of the preferred embodiment of the present invention. A liquid crystal display of 12 µm thickness was made by irradiating with an U.V. light the prepolymer comprising the liquid crystal material (FX-1002, product name, Chisso Chemical Corp. Cross-over frequency is 1 KHz ) and acrylic monomer material (Hydroxyethylmethacrylate, Nippon Kayaku Co., Ltd). In FIG. 2, the abscissa indicates the applied voltage with 100 Hz frequency to the device and the ordinate indicates the regular transmittance of the element. The solid line indicated as $V_0$ indicates that transmittance occurs when a voltage signal is continuously applied to the liquid crystal display. The broken line indicated as Vi indicates transmittance after a voltage signal is applied and removed. According to the solid line, a rise in transmittance at the point of 10 volts is initially noted, increasing with an increase in applied voltage, reaching 70 percent at the point of 30 volts. According to the broken line, transmittance rises to 10 percent at the point of 30 volts and becomes 70 percent at the point of 50 volts. In both cases, the transmittance of the film initially increases gradually and subsequently increases sharply and then increases gradually, apparently at a saturated transmittance level. It will be understand from the graph that the liquid crystal element can be used by two driving modes.

A first mode referred to as "dynamic image display mode" is generally defined by the left portion of the graph. In this portion, the change of transmittance of the liquid crystal element responds quickly to the switching operation of the applied voltage. For example, if an applied voltage less than 40 volts is used as the driving voltage to the liquid crystal display device, transmittance of the element can be controlled quickly within the range from zero to 80 percent by a switching operation of the applied voltage.

A second mode referred to as "static image display mode" is defined generally by the right portion of the graph. In this portion, the transmittance of the liquid crystal display does not change drastically by the switching operation of the applied voltage. For example, if an applied voltage of not less than 40 volts is used as the driving voltage to the liquid crystal element, the transmittance of the liquid crystal element is kept at a level of more than 60 percent after the removing of applied voltage.

In a "memory state", the memorized image (Transparent state) can be kept for more than 1 year without any electric field.

It is possible to use both modes of operation appropriately to display a "moving image" and a "static image" by using the aforementioned characteristic of the display element. For example, if the liquid crystal device as indicated in FIG. 2 is used as a display element, the transmittance of the display device will be 75 percent when the applied voltage is 30 volts, and will be reduced a few percent after the removing of the applied voltage. The changes of the transmittance following to the changes of applied voltage occur fast enough (on the order of a millisecond) to display a "moving image". Although the change in transmittance also occurs at the same speed (on the order of millisecond) after 80 volt signal is applied to the element and cut off, a level of more than 75 percent transmittance is retained, enough to display a "static image" after the removing of applied voltage. The frequency of the applied voltage signal is selected from various frequencies lower than the cross-over frequency of the liquid crystal material.

Switching from "static image display mode" to "dynamic image display mode" is done by applying a voltage signal having a frequency higher than the cross-over frequency to the electrodes of the liquid crystal display element. At frequencies higher than the cross-over frequency, the liquid crystal material indicates dielectric anisotropy characteristic opposite to that indicated at frequencies lower than the cross-over frequency. The memorized transparency state of the liquid crystal element turned to opaque state which have about 1% transmittance by applying 100 volts voltage which has 10 KHz frequency sufficiently higher than the cross-over frequency (1 KHz)of the liquid crystal material. The transmittance is almost same transmittance with the device to which the voltage is not applied.

Figure 3B:
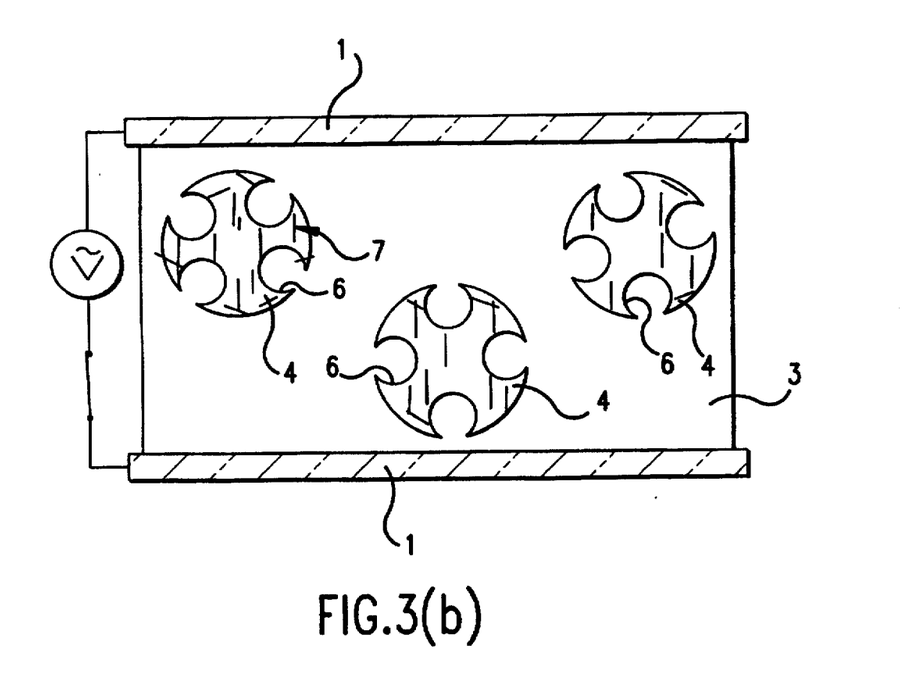
Figure 4A:
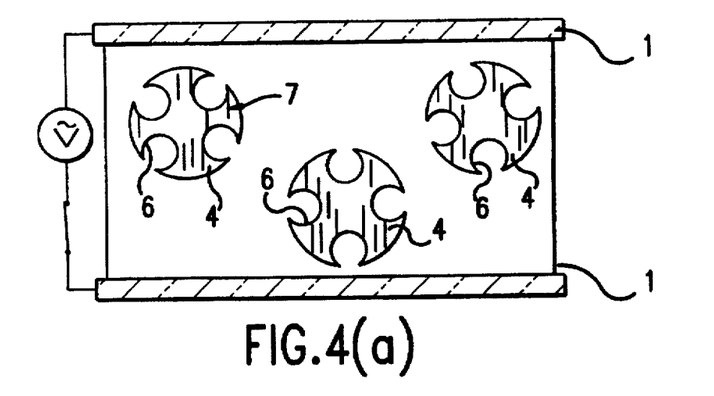
FIGS. 4(a), 4(b) and 4(c) are a schematic representation of the operational model of memory state in accordance with the present invention.
Figure 4B:
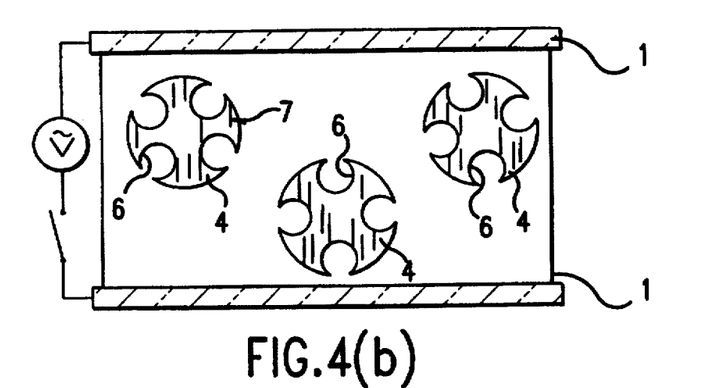

In the embodiments illustrated in FIGS. 3 and 4, where the same reference numbers are used as for FIG. 1. The dual-frequency responsive liquid crystal material 4 indicates a positive dielectric anisotropy (vertical direction) to the frequency f1 and a negative dielectric anisotropy (horizontal direction) to the frequency f2. With no electric field, the whole portion of the liquid crystal display device is in a opaque state, because the direction of the directors 7 of the liquid crystal material 4 is random as indicated in FIG. 3(a). By applying a voltage V having a frequency f1 to the transparent electrodes, the liquid crystal display element become transparent, most of the directors 7 of liquid crystal material 4 orient in parallel to the direction of applied electric field, as indicated in FIG. 3(b). However, any of the directors 7 at the interface portion 5 between the liquid crystal material 4 and the polymer layer 3 remain in a random state, because of the existence of strong interactive forces between polymer layer 3 and liquid crystal material 4. Therefore, when the applied voltage is turned off, the liquid crystal display element returns to an opaque state, because directors 7, which were oriented parallel to the electric field, are forced to a random state by the liquid crystal directors located at interface portion 5, as shown in FIG. 3 (c). By applying a stronger or higher voltage than voltage V, liquid crystal directors 7 located in the interface portion also orient parallel to the higher applied voltage, because a stronger force than the interactive force, is generated by the applied voltage, as indicated in FIG. 4 (a). The directors 7 that are located in the interface portion 5 which are oriented to the direction parallel to the applied voltage will be stable in a vertical direction with no electric field because a transition from vertical state to horizontal state will be prohibited by the strong interaction between two materials or the shape effect of the interface portion such as non-uniform or irregular or microconvex surfaces therebetween.

Figure 4C:
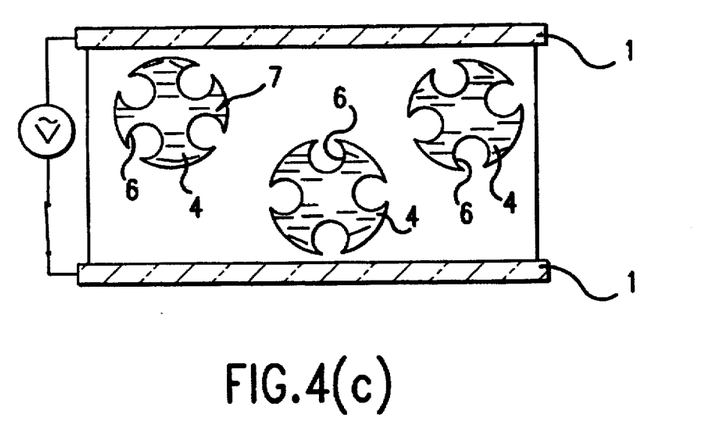
Figure 5A:
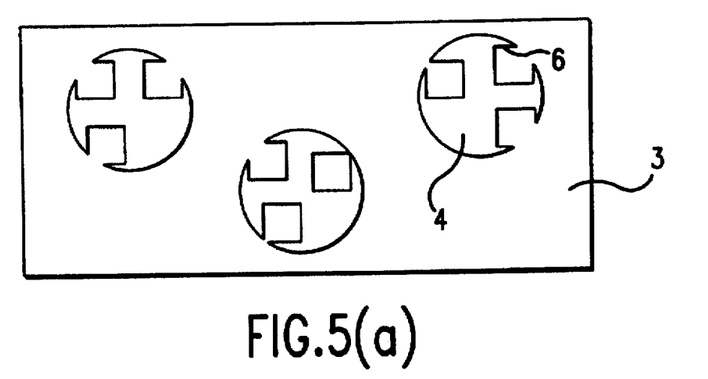
FIGS. 5(a), 5(b) and 5(c) are cross-sectional views of another embodiment of the liquid crystal display device in accordance with the present invention.
Figure 5B:
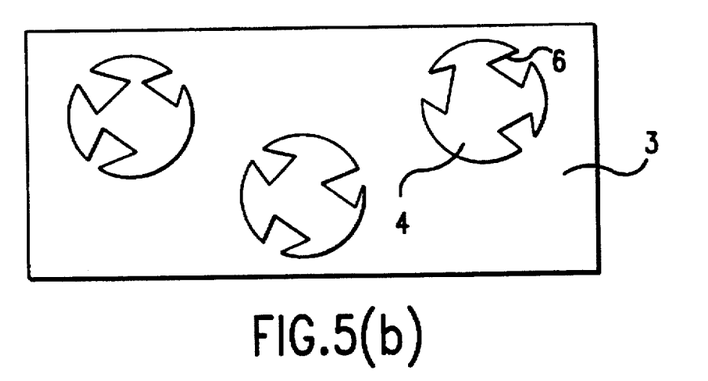
Figure 5C:
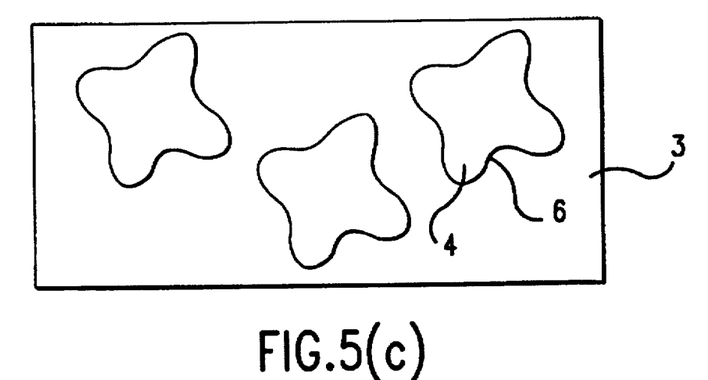

In accordance with the non-reversible orientation of liquid crystal directors 7 located in the interface portion 5 between two materials, the remaining directors of liquid crystal also remain in their oriented direction without any electric field. Therefore the transparent state can be kept for a long time. Next, by applying a second voltage having frequency f2, which is higher than the cross-over frequency of the liquid crystal material, the directors 7 of the liquid crystal material 4 will be oriented perpendicular to the direction of the applied electric field again, by receiving the orienting force as indicated in FIG. 4(c). The orienting force is the force against the vertically oriented liquid crystal directors 7. As a result of the generation of this force, directors 4 of the liquid crystal material returned to a random state. Thus, the entire liquid crystal turned back to an opaque state again as indicated FIG. 4 (a).

The magnitude of the voltage applied to the element to change the display mode, therefore be preferably larger than that of the two display modes, or enough to move the directors at the interface portion. Thus, in accordance with the present invention, a dynamic moving image can be displayed by selectively applying a first relatively low voltage which has lower frequency than the cross-over frequency to the liquid crystal display. Static images can be displayed by selectively applying a second relatively high voltage which has lower frequency than the cross-over frequency to the liquid crystal display. A memorized image (static image) can be erased by applying a third voltage with a magnitude higher than those of first or second voltages and having a higher frequency than the cross-over frequency of the liquid crystal material.

In this preferred embodiment, preferably the first voltage is the voltage which can substantially orient the most of dual-frequency liquid crystal molecules to first direction parallel to the applied electric field. Preferably, the second voltage is the voltage which can substantially orient the all dual-frequency liquid crystal molecules including the liquid crystal molecules located in the interface portion with the polymer material to a first direction parallel to the applied electric field. Preferably, the third voltage is the voltage which can substantially re-orient the all liquid crystal molecule to second direction perpendicular to the first direction, the third voltage is preferably higher than the first voltage and second voltage magnitudely. The first voltage is also preferably not more than the voltage ($V_{20}$) when the liquid crystal display indicates 20 percent of transmittance ($T_{20}$) of the maximum transmittance ($T_{max}$) of the liquid crystal display after the removing of the applied voltage. The second voltage is also preferably not less than the voltage ($V_{80}$) when the liquid crystal display indicates 80 percent of transmittance ($T_{80}$) of the maximum transmittance ($T_{max}$) of the liquid crystal display after the removing of the applied voltage. In one possible embodiment, the first voltage is in a range generally from 0.01 Vrms to 500 Vrms, preferably 0.05 Vrms to 100 Vrms, more preferably 0.1 to 50 Vrms although values outside these ranges are possible. The second voltage is in a range generally from 0.1 Vrms to 1000 Vrms, preferably 0.5 Vrms to 500 Vrms, more preferably 10 to 300 Vrms although values outside these ranges are possible. The third voltage is in a range generally from 0.5 Vrms to 1500 Vrms, preferably 1 Vrms to 700 Vrms, more preferably 20 to 500 Vrms although values outside these ranges are possible.

Figure 6:
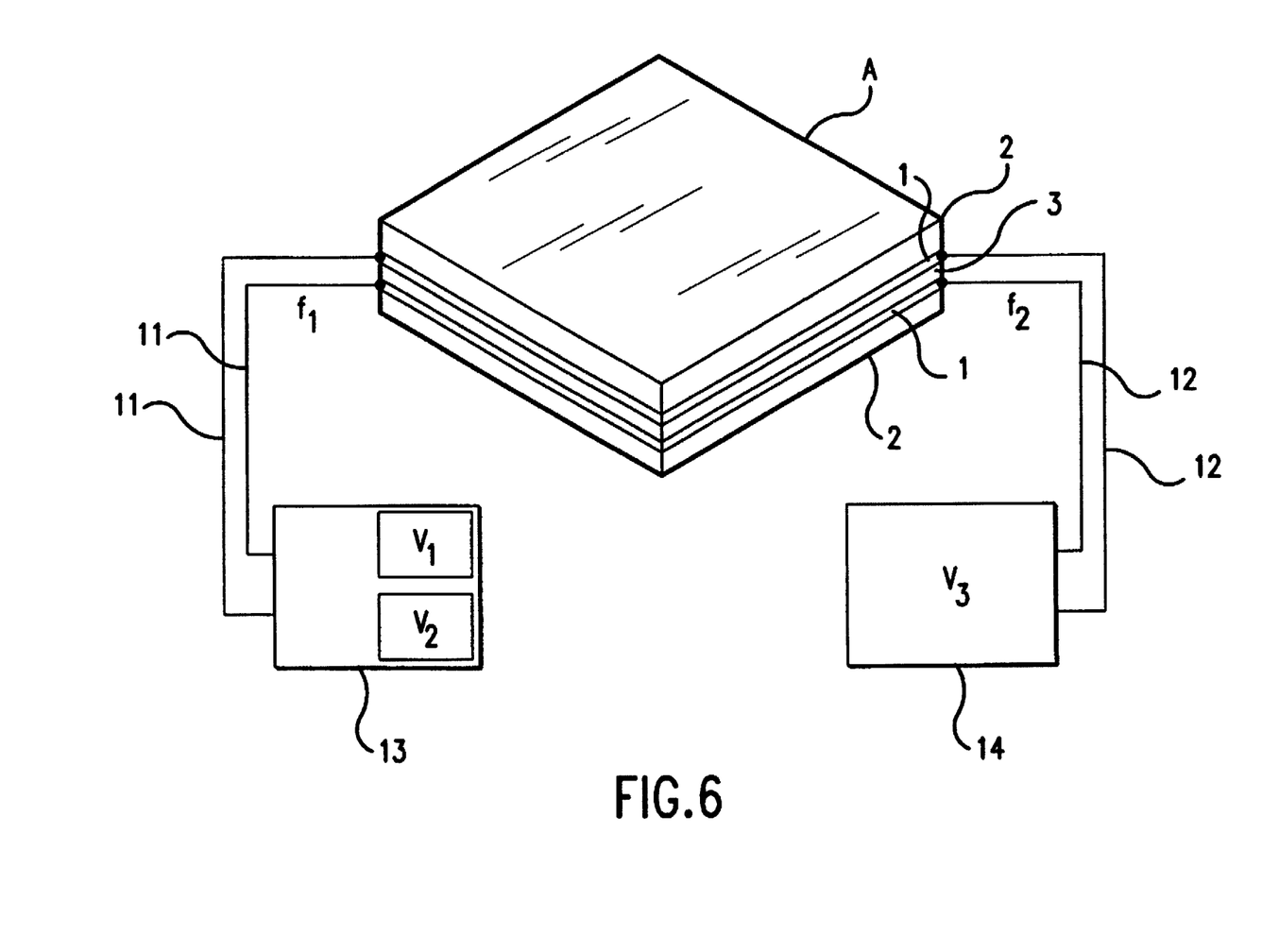
FIG. 6 is a schematic representation of the liquid crystal display device of present invention.

FIG. 6 shows a liquid crystal display device of present invention. A first and second voltage source 13 provide a first driving voltage and second driving voltage with a frequency f1. In this source, the first voltage V1 and second voltage V2 can be interchangeably switched. The third voltage source 14 provide a third voltage V3 with a second frequency f2 to change the display mode of the display device. Each power source is coupled to the transparent electrodes 1, 1 by wires 11, 12, or the like.

The liquid crystal device can be switched rapidly and efficiently from the memorized transparent state to the ON-OFF reversible state by using less energy than prior heat energy responsive device according to the present invention, therefore by enabling the display memory state, the liquid crystal display can be used in a field of new display technology such as high-density high-capacity display devices, or memory devices for the display device. The present invention can be adapted to improve the high speed addressing or high ON-OFF switching capability for liquid crystal light bulb devices using a laser beam. In addition, the present invention can be adapted to the hard-copy medium or card medium to ensure the rewritable and erasable capabilities using electric switching arrangements.

EXAMPLE 1

A. Preparation of the Liquid crystal device I

The following materials were mixed, and then treated by an ultrasonic washer for 10 minutes to prepare a prepolymer composition.

1. 50 parts of Dual-frequency Liquid crystal composition which name is FX-1002 produced by Chisso Petrochemical Co. Ltd (Cross-over frequency: 1 KHz)
2. 50 parts of Acrylic monomer which name is HEMA, having a chemical structure of $CH_2=C(CH_3)COOCH_2CH_2OH$, which is produced by Nippon Kayaku Co. Ltd.
3. 3 parts of 2-hydroxy-2-methyl-1-phenylpropane-1-on as a UV polymerization initiator produced by Merck Japan Co. ltd in a product name of Darocure 1173
4. 1 part of Spherical resin as a spacer material produced by Sekisui Finechemical Co. Ltd in a product name of Micropearl SP-212

The mixed prepolymer composition was uniform and transparent.

The mixed composition was injected to the space between two glass plates of a size of 50 mm×50 mm each having a transparent indium tin oxide (ITO) electrode at their inner surface. The inner space between two glass plates was 12 μm in thickness. The polymerization of the injected prepolymer composition was conducted by irradiating the glass plates with a uniform UV light of 365 nm wavelength. The prepolymer composition turned to a uniform opaque state after irradiation with the UV light. The resulting liquid crystal display material had less than 1% transmittance under no electric field.

B. Experiment-I

The transmittance of the resulting liquid crystal device increased to 80% when a voltage of 30 Vrms (frequency: 100 HZ) (a first voltage) was applied to the transparent electrodes. This device was substantially transparent to the incident light at this time. Then, the transmittance of the device decreased to 4% after cutting off the voltage. The device was substantially opaque to the incident light at this time. The opaque state and the transparent state of the device were reversibly and repeatedly switched by applying the voltage.

Next, the transmittance of the liquid crystal device was measured at 85% when a voltage of 80 Vrms (frequency: 100 HZ) (second voltage) was applied to the transparent electrodes. Then, the transmittance of the device decreased to 75% at this time and remained substantially the same value after removing the voltage. The device was substantially transparent to incident light at this time. The device maintained about 75% of transmittance for 1 year, a room temperature without any electric field.

Then, the voltage of 100 Vrms (frequency: 100 KHz) was applied to the transparent liquid crystal device for 3 minutes. After the applying the voltage, the whole area of the device turned to uniform opaque state. After cutting off the voltage, the transmittance was measured at 1%. The cross section of the polymer-liquid crystal material formed between two glass plates was observed by a scanning electronic microscope (SEM) and the many ununiform microconvex structure formed on the liquid crystal-polymer interface portion were confirmed.

EXAMPLE 2

A. Preparation of the liquid crystal device II

The following materials were mixed, and then treated by an ultrasonic washer for 10 minutes to prepare a prepolymer composition.

1. 50 parts of Dual-frequency Liquid crystal composition which name is FX-1001 produced by Chisso Petrochemical Co. Ltd (Cross-over frequency: 13 KHz)
2. 50 parts of Acrylic monomer which name is HEMA, having a chemical structure of $CH_2=C(CH_3)COOCH_2CH_2OH$, which is produced by Nippon Kayaku Co. Ltd.
3. 3 parts of 2-hydroxy-2-methyl-1-phenylpropane-1-on as a UV polymerization initiator produced by Merck Japan Co. ltd in a product name of Darocure 1173
4. 1 part of Spherical resin as a spacer material produced by Sekisui Finechemical Co. Ltd in a product name of Micropearl SP-212

The mixed prepolymer material was uniform and transparent. The mixed material was injected to the space between two glass plates of a size of 50 mm×50 mm each having a transparent indium tin oxide (ITO) electrode at their inner surface. The inner space between two glass plates was 12 μm in thickness. The polymerization of the injected prepolymer material was conducted by irradiating the glass plates with a uniform UV light of 365 nm wavelength. The mixed liquid material turned to a uniform opaque state after irradiation with the UV light. The resulting liquid crystal device had about 3% transmittance under no electric field.

B. Experiment-II

The transmittance of the liquid crystal device increased to 70% when a voltage of 40 Vrms (frequency: 1 KHZ) (a first voltage) was applied to the transparent electrodes. This device was substantially transparent at this time. Then, the transmittance of the device decreased to 5% after the cutting off the voltage. The device was substantially opaque at this time. The opaque state and the transparent state of the device were reversibly and repeatedly switched by applying the voltage.

Next, the transmittance of the liquid crystal device was measured at 85% when the voltage of 80 Vrms (frequency: 1 KHZ) (second voltage) was applied to the transparent electrodes. Then, the transmittance of the device decreased to 70% and remained substantially the same value after removing the voltage. The device was substantially transparent at this time. The device maintained about 70% of transmittance for 1 year, a room temperature without any electric field.

Then, a voltage of 90 Vrms (frequency: 100 KHz) was applied to the transparent liquid crystal device for 3 minutes. After the applying the voltage, the whole area of the device turned to uniform opaque state. After cutting off the voltage, transmittance was measured at 3%. The cross section of the polymer-liquid crystal material formed between two glass plates was observed by a scanning electronic microscope (SEM) and the many ununiform microconvex portions formed on liquid crystal-polymer interface portion were confirmed.

We claim:

1. A method of erasing information on a display using a polymer liquid crystal device containing a transparent polymer and dual-frequency responsive liquid crystal material, the liquid crystal material having a cross-over frequency, and dispersed in the transparent polymer in a phase-separated state, comprising the steps of:
   selectively applying a first voltage signal having a first frequency lower than the cross-over frequency to orient permanently the liquid crystal material to a first direction to display information permanently; and
   selectively applying a second voltage signal having a frequency higher than the cross-over frequency to orient the liquid crystal material perpendicularly to the first direction, to erase the permanent information.

2. A method of displaying information on a display using a polymer liquid crystal device containing a transparent polymer and dual-frequency responsive liquid crystal material, the liquid crystal material having cross-over frequency, and dispersed in the transparent polymer in a phase-separated state, comprising the steps of:
   selectively applying a first voltage signal having a first frequency lower than the cross-over frequency to orient reversibly the liquid crystal material to a first direction to display temporary information;
   selectively applying a second voltage signal having a magnitude higher than the first voltage, and the first frequency to orient permanently the liquid crystal material to the first direction to display permanent information; and
   selectively applying a third voltage signal having a second frequency higher than the cross-over frequency to orient the liquid crystal material perpendicularly to the first direction, to erase the permanent information.

3. The method as described in claim 2, wherein the first voltage signal orients a significant portion of liquid crystal molecules in the liquid crystal material to the first direction parallel to a direction of an electric field of the first voltage signal, and the second voltage signal orients substantially all liquid crystal molecules including ones located at an interface portion with the transparent polymer to the first direction.

4. The method as described in claim 2, wherein the third voltage signal re-orients substantially all liquid crystal molecules including ones located in an interface portion with the transparent polymer to a direction perpendicular to the first direction.

5. The method as described in claim 2, wherein the third voltage signal is higher in magnitude than the second voltage signal.

6. A Liquid crystal display device for displaying a dynamic moving image and a static dynamic image interchangeably comprising:

a transparency modulation layer having a transparent polymer and dual-frequency responsive liquid crystal material which has a cross-over frequency, the liquid crystal material is dispersed in the transparent polymer in a phase-separate state to make an interface portion therebetween, the interface portion having an irregular surface portion enough to prevent the free orientation of the liquid crystal material response to an selective electric field;

a plurality of electrodes arranged with respect to the liquid crystal material to apply an electric field thereto; and a driving source coupled to the electrodes to provide a first voltage selectively providing the electric field having a first frequency lower than the cross-over frequency, a second voltage magnitudely higher than the first voltage having the first frequency and a third voltage having a second frequency higher than the cross-over frequency.

7. A liquid crystal display device claimed in claim 6, wherein the first voltage signal orients a significant portion of liquid crystal molecules in the liquid crystal material to a first direction parallel to a direction of an electric field of the first voltage signal, and the second voltage signal orients substantially all liquid crystal molecules including ones located in an interface portion with the transparent polymer to the first direction.

8. A liquid crystal display device claimed in claim 6, wherein the third voltage signal re-orients substantially all liquid crystal molecules including ones located in an interface portion with the transparent polymer to a direction perpendicular to the first direction.

9. A liquid crystal display device claimed in claim 6, wherein the third voltage is greater in magnitude than the second voltage.

* * * * *